United States Patent
Seagle et al.

(10) Patent No.: US 10,832,712 B1
(45) Date of Patent: Nov. 10, 2020

(54) MAGNETIC THIN FILM RECORDING HEAD MODULE HAVING ELECTRICAL SHIELDING BETWEEN READ AND WRITE TRANSDUCER ARRAYS

(71) Applicant: International Business Machines Corporation, Armonk, NY (US)

(72) Inventors: David Seagle, Morgan Hill, CA (US); Robert Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/748,646

(22) Filed: Jan. 21, 2020

(51) Int. Cl.
| | |
|---|---|
| *G11B 5/48* | (2006.01) |
| *G11B 5/39* | (2006.01) |
| *G11B 5/31* | (2006.01) |
| *G11B 20/10* | (2006.01) |
| *G11B 19/02* | (2006.01) |
| *G11B 5/115* | (2006.01) |
| *G11B 5/11* | (2006.01) |
| *G11B 5/10* | (2006.01) |
| *G11B 5/29* | (2006.01) |
| *G11B 5/17* | (2006.01) |

(52) U.S. Cl.
CPC .............. *G11B 5/3912* (2013.01); *G11B 5/10* (2013.01); *G11B 5/11* (2013.01); *G11B 5/115* (2013.01); *G11B 5/17* (2013.01); *G11B 5/29* (2013.01); *G11B 5/315* (2013.01); *G11B 5/3116* (2013.01); *G11B 5/3903* (2013.01); *G11B 5/3967* (2013.01); *G11B 5/4893* (2013.01); *G11B 19/02* (2013.01); *G11B 20/10* (2013.01)

(58) Field of Classification Search
None
See application file for complete search history.

(56) References Cited

U.S. PATENT DOCUMENTS

| | | | |
|---|---|---|---|
| 3,252,153 A | 5/1966 | Mos | |
| 3,824,622 A * | 7/1974 | Kashimoto | .............. G11B 5/03 360/121 |
| 5,134,534 A * | 7/1992 | Sasaki | ...................... G11B 5/112 360/123.36 |

(Continued)

FOREIGN PATENT DOCUMENTS

| | | | | |
|---|---|---|---|---|
| JP | 62173608 A | * | 7/1987 | ........... G11B 5/4907 |
| JP | 06176323 A | * | 6/1994 | |

(Continued)

OTHER PUBLICATIONS

Kahwaty et al, "Wafer Design Techniques for Same-Gap-Servo Head," IP.com Prior Art Database, Technical Disclosure No. IPCOM000117067D, Dec. 1, 1995, 3 pages.

*Primary Examiner* — William J Klimowicz
(74) *Attorney, Agent, or Firm* — Zilka-Kotab, P.C.

(57) ABSTRACT

An apparatus, in accordance with one approach, includes a module having a first array of read transducers. A first electrical shielding layer is positioned above the first array of read transducers. An array of write transducers is positioned above the first electrical shielding layer. A second electrical shielding layer is positioned above the array of write transducers. A second array of read transducers is positioned above the second electrical shielding layer.

22 Claims, 11 Drawing Sheets

(56) References Cited

U.S. PATENT DOCUMENTS

| | | | | |
|---|---|---|---|---|
| 5,535,078 A * | 7/1996 | Warwick | G06K 7/084 | 360/125.01 |
| 5,678,086 A * | 10/1997 | Gandola | G03B 17/24 | 360/122 |
| 7,042,683 B1 * | 5/2006 | Cross | G11B 5/3166 | 360/319 |
| 7,486,475 B2 * | 2/2009 | Biskeborn | G11B 5/3912 | 360/121 |
| 7,551,393 B2 * | 6/2009 | Biskeborn | G11B 5/4893 | 360/121 |
| 7,656,610 B1 * | 2/2010 | Campos | G11B 5/00826 | 360/121 |
| 8,004,799 B2 * | 8/2011 | Biskeborn | G11B 5/295 | 360/317 |
| 8,130,473 B2 * | 3/2012 | Hachisuka | G11B 5/115 | 360/316 |
| 9,355,678 B2 * | 5/2016 | Biskeborn | G11B 20/10305 | |
| 9,978,411 B1 * | 5/2018 | Biskeborn | G11B 20/1201 | |
| 10,311,904 B2 * | 6/2019 | Biskeborn | G11B 20/1201 | |
| 2004/0021982 A1 * | 2/2004 | Ozue | G11B 5/3951 | 360/123.09 |
| 2004/0141255 A1 * | 7/2004 | Ogawa | G11B 5/3977 | 360/129 |
| 2006/0039082 A1 * | 2/2006 | Biskeborn | G11B 5/4893 | 360/129 |
| 2007/0030594 A1 * | 2/2007 | Biskeborn | G11B 5/10 | 360/129 |
| 2007/0097556 A1 * | 5/2007 | Biskeborn | G11B 5/3106 | 360/317 |
| 2007/0133131 A1 * | 6/2007 | Biskeborn | G11B 5/3912 | 360/323 |
| 2008/0137235 A1 * | 6/2008 | Biskeborn | G11B 5/584 | 360/317 |
| 2010/0110582 A1 * | 5/2010 | Hachisuka | G11B 5/40 | 360/83 |
| 2015/0255093 A1 * | 9/2015 | Biskeborn | G11B 5/29 | 369/53.38 |

FOREIGN PATENT DOCUMENTS

| | | | | |
|---|---|---|---|---|
| JP | 2005122838 A | * | 5/2005 | |
| JP | 2007265555 A | * | 10/2007 | G11B 5/3958 |
| JP | 2009032337 A | * | 2/2009 | |

* cited by examiner

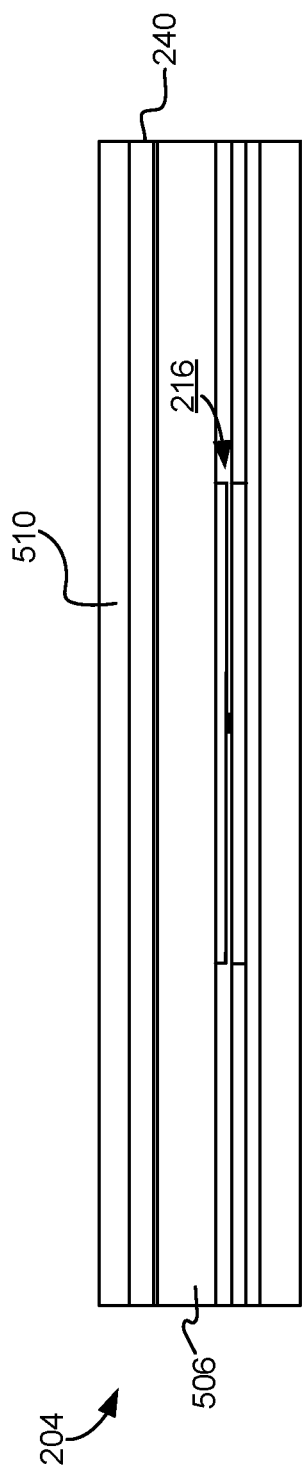
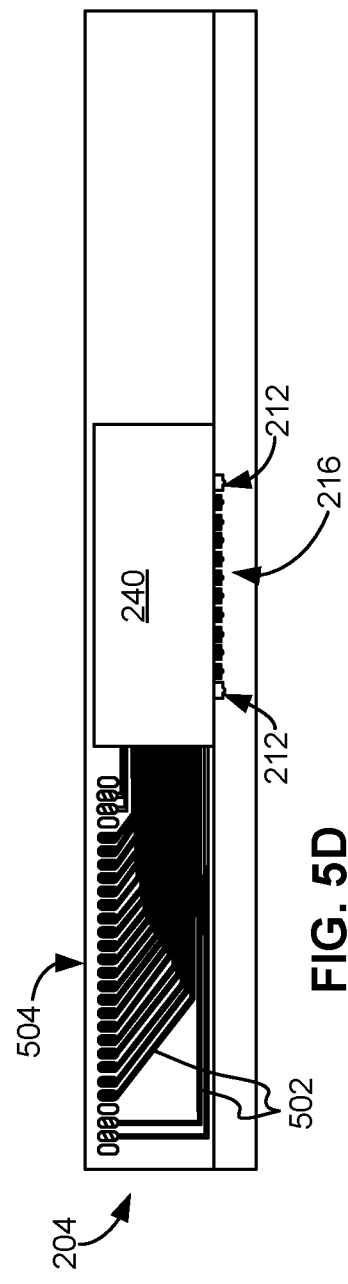

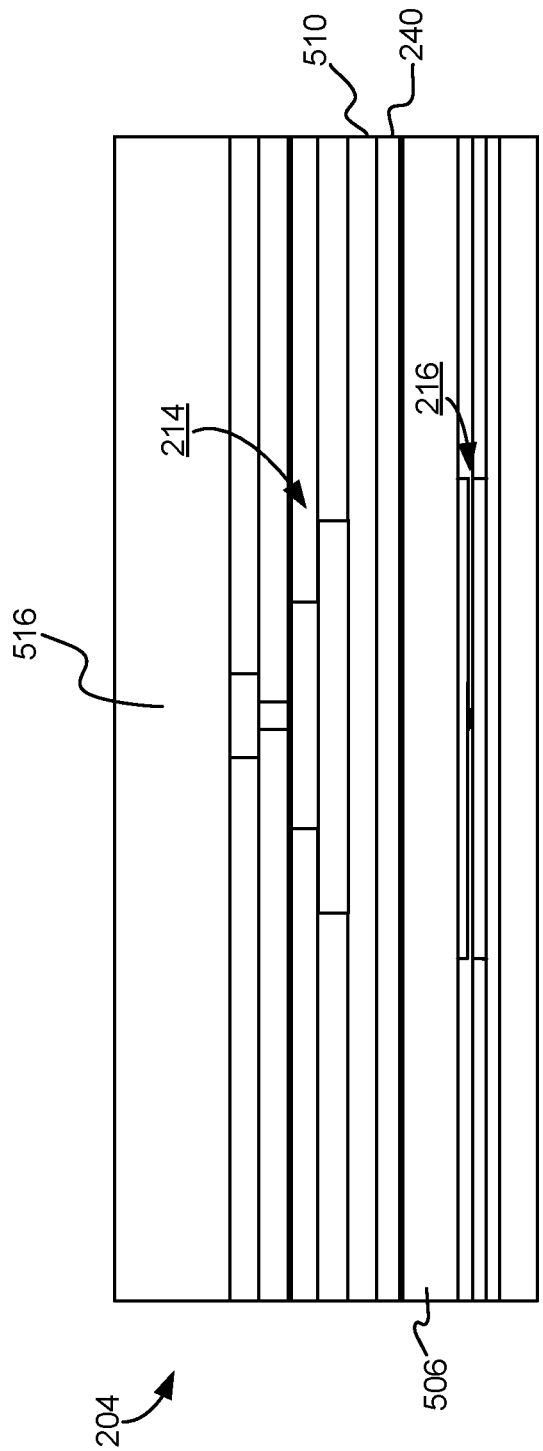
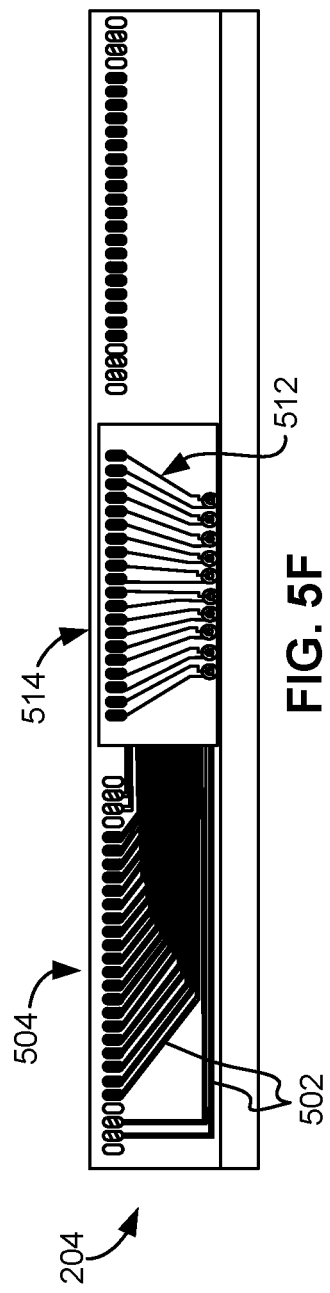

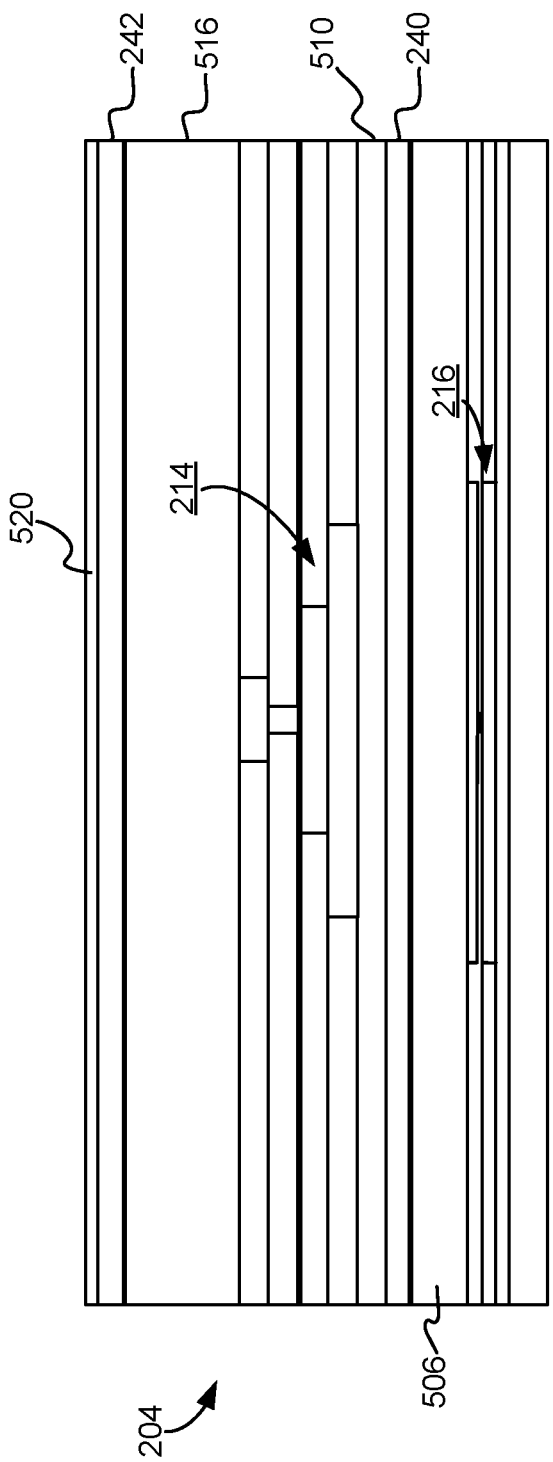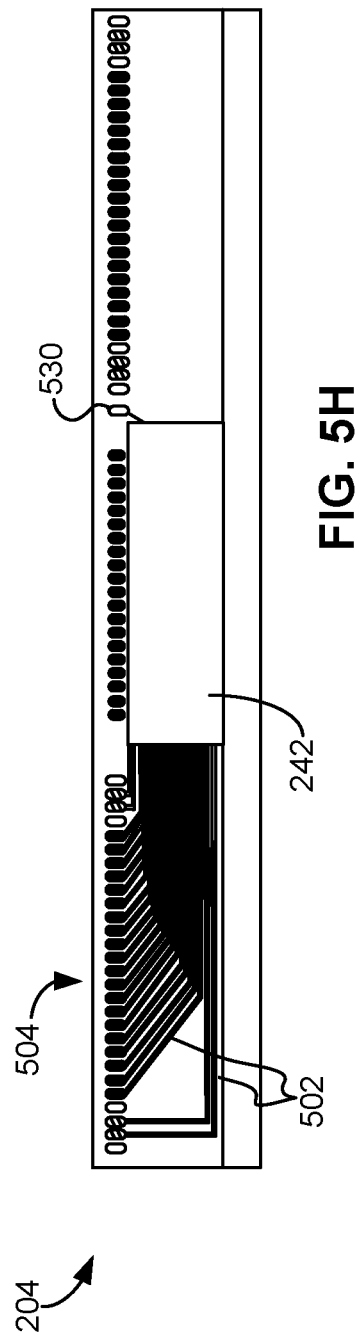

MAGNETIC THIN FILM RECORDING HEAD MODULE HAVING ELECTRICAL SHIELDING BETWEEN READ AND WRITE TRANSDUCER ARRAYS

BACKGROUND

The present invention relates to data storage systems, and more particularly, this invention relates to a magnetic recording head module having electrical shielding layers therein for reducing crosstalk, and related systems incorporating such a module.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For magnetic storage systems, that goal has led to increasing the track and linear bit density on the recording media, and in some cases, decreasing the thickness of the magnetic recording medium. However, the development of small footprint, higher performance magnetic recording systems has created various challenges ranging from the design of magnetic head assemblies for use in such systems to dealing with media dimensional instability.

One particular problem that has heretofore prevented further miniaturization of magnetic head assemblies is that of crosstalk. Crosstalk primarily results from inductive and capacitive coupling between adjacent leads. Crosstalk between the leads appears as noise in the readback signal, which adversely affects the critical signal to noise ratio, leading to limits in data rate, increased read error rate, etc.

Some magnetic storage systems utilize read-while-write verification, in which the just-written data is read by a trailing read transducer array to verify that the data was written correctly. Crosstalk between the writer leads and reader leads in modern magnetic head assemblies at today's dimensions has heretofore been believed to be so severe as to prevent the use of concurrently-active write and read transducer arrays on a single module. Accordingly, modern magnetic data storage systems have utilized separate modules to house the array of read transducers and the array of write transducers that are concurrently active during read-while-write verification.

Unfortunately, the separation of concurrently-active arrays into separate modules results in several problems of its own. During fabrication, each module must be post-wafer processed, such that a three-module head requires three post-wafer processes. Moreover, alignment of the arrays on the separate modules is extremely difficult, resulting in large variations in alignment from head to head. Each module has a separate cable, increasing cost. In addition, the higher weight of a multi-module head requires more power for track following, and makes movement of the head less nimble.

What is needed is an apparatus that eliminates crosstalk while allowing concurrent use of an array of read transducers and an array of write transducers in a single module.

SUMMARY

An apparatus, in accordance with one approach, includes a module having a first array of read transducers. A first electrical shielding layer is positioned above the first array of read transducers. An array of write transducers is positioned above the first electrical shielding layer. A second electrical shielding layer is positioned above the array of write transducers. A second array of read transducers is positioned above the second electrical shielding layer.

The electrical shielding layers help electrically isolate the transducers and their lead structures in the middle array from the transducers and their lead structures in the outer arrays of transducers, thereby reducing crosstalk therebetween.

In some approaches, the apparatus includes first leads extending from the read transducers in the first array to a first pad area of the module, second leads extending from the write transducers to a second pad area of the module that is spaced from the first pad area, and third leads extending from the read transducers in the second array to a third pad area of the module that is spaced from the first and second pad areas.

Segregation of the read and write pads into distant groups not only further reduces crosstalk between the sets of leads, but also allows introduction of the electrical connection to the cable such that a cable can be designed to maintain the segregation and thus avoid crosstalk in the cable.

In some approaches, the first leads lie along a first plane, the second leads lie along a second plane spaced from and above the first plane, and the third leads lie along a third plane spaced from and above the second plane. This configuration allows the lead layers of each array to be isolated by the electrical shielding layers, as well as allows connecting the transducers to pads such that the read transducer pads are disentangled from the write transducer pads, thereby enabling cabling to each array in separate groups, which further reduces crosstalk.

An apparatus, in accordance with one approach, includes a module having a first array of write transducers. A first electrical shielding layer is positioned above the first array of write transducers. An array of read transducers is positioned above the first electrical shielding layer. A second electrical shielding layer is positioned above the array of read transducers. A second array of write transducers is positioned above the second electrical shielding layer.

The electrical shielding layers help electrically isolate the transducers and their lead structures in the middle array from the transducers and their lead structures in the outer arrays of transducers, thereby reducing crosstalk therebetween.

In some approaches, the apparatus includes first leads extending from the write transducers in the first array to a first pad area of the module, second leads extending from the read transducers to a second pad area of the module that is spaced from the first pad area, and third leads extending from the write transducers in the second array to a third pad area of the module that is spaced from the first and second pad areas.

Segregation of the read and write pads into distant groups not only further reduces crosstalk between the sets of leads, but also allows introduction of the electrical connection to the cable such that a cable can be designed to maintain the segregation and thus avoid crosstalk in the cable.

In some approaches, the first leads lie along a first plane, wherein the second leads lie along a second plane spaced from and above the first plane, wherein the third leads lie along a third plane spaced from and above the second plane. This configuration allows the lead layers of each array to be isolated by the electrical shielding layers, as well as allows connecting the transducers to pads such that the read transducer pads are disentangled from the write transducer pads, thereby enabling cabling to each array in separate groups, which further reduces crosstalk.

A method for fabricating a module, in accordance with one approach, includes forming a first array of data transducers of a first type, forming a first electrical shielding layer above the first array of data transducers, and forming an array of data transducers of a second type above the first electrical shielding layer. A second electrical shielding layer is formed above the array of data transducers of the second type. A second array of data transducers is formed above the second electrical shielding layer.

The electrical shielding layers help electrically isolate the transducers and their lead structures in the middle array from the transducers and their lead structures in the outer arrays of transducers, thereby reducing crosstalk therebetween.

Any of these approaches may be implemented in conjunction with a magnetic data storage system such as a tape drive system, which may include a magnetic head, a drive mechanism for passing a magnetic medium (e.g., recording tape) over the magnetic head, and a controller electrically coupled to the magnetic head.

Other aspects of the present invention will become apparent from the following detailed description, which, when taken in conjunction with the drawings, illustrate by way of example the principles of the invention.

BRIEF DESCRIPTION OF THE DRAWINGS

FIGS. 5A-5J depict a process for forming a module as shown in FIG. 2C, in accordance with one approach.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of magnetic data storage systems, as well as operation and/or component parts thereof.

In one general approach, an apparatus includes a module having a first array of read transducers. A first electrical shielding layer is positioned above the first array of read transducers. An array of write transducers is positioned above the first electrical shielding layer. A second electrical shielding layer is positioned above the array of write transducers. A second array of read transducers is positioned above the second electrical shielding layer.

In another general approach, an apparatus includes a module having a first array of write transducers. A first electrical shielding layer is positioned above the first array of write transducers. An array of read transducers is positioned above the first electrical shielding layer. A second electrical shielding layer is positioned above the array of read transducers. A second array of write transducers is positioned above the second electrical shielding layer.

In yet another general approach, a method for fabricating a module includes forming a first array of data transducers of a first type, forming a first electrical shielding layer above the first array of data transducers, and forming an array of data transducers of a second type above the first electrical shielding layer. A second electrical shielding layer is formed above the array of data transducers of the second type. A second array of data transducers is formed above the second electrical shielding layer.

Figure 1A:
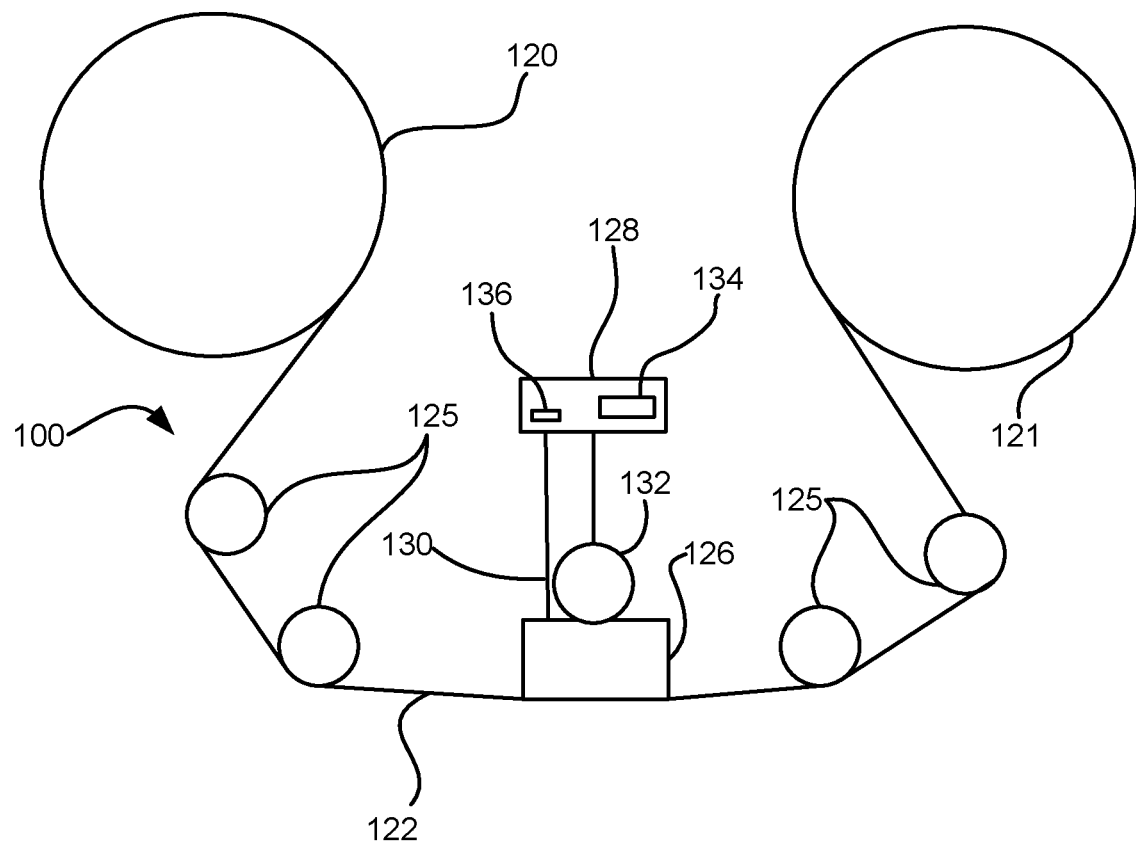
FIG. 1A is a schematic diagram of a simplified tape drive system according to one approach of the present invention.

FIG. 1A illustrates a simplified tape drive 100 of a tape-based data storage system, which may be employed in the context of the present invention. While one specific implementation of a tape drive is shown in FIG. 1A, it should be noted that the aspects described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
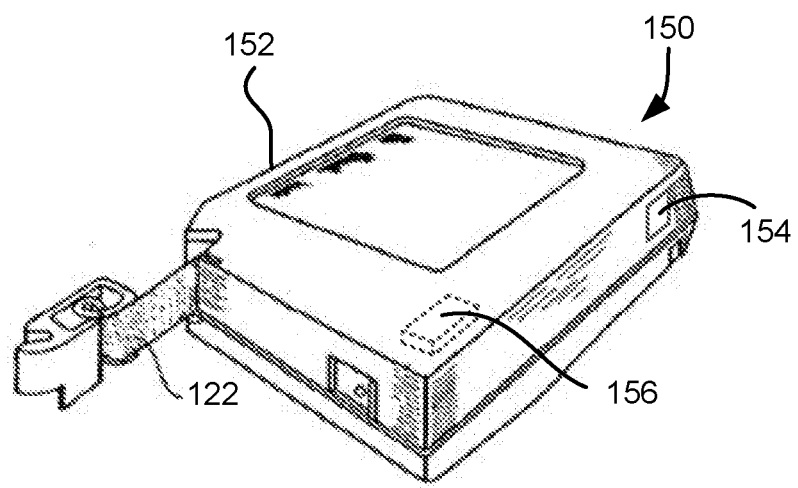
FIG. 1B is a schematic diagram of a tape cartridge according to one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

In another approach, the tape-based data storage system may be one in which the magnetic recording tape and the drive components are enclosed in an embedded system. Such embedded system may have similar components as the tape drive described above. One or more magnetic recording tapes are integrated with the embedded system, along with a support structure for supporting the magnetic recording tape in the embedded system, e.g., one or more spools, one or more guides, etc.

The magnetic recording tape is preferably nonremovable, except by disassembling portions of the embedded system. Moreover, in some approaches, several dedicated magnetic recording tapes are present. In one aspect, the embedded system includes a mechanism configured to move at least the magnetic head from tape to tape as needed. In another aspect, several magnetic heads may be present to enable operation on multiple tapes simultaneously.

In some approaches, the magnetic recording tape and some of the drive components are open to ambient air. In preferred approaches, the tape and drive components are sealed in a housing with a defined gas structure, e.g., to prolong the life of the embedded system.

Embedded systems with nonremovable tape(s) have an advantage over drives that operate with tape cartridges, in that the well-known problems associated with different drives operating on the same magnetic recording tape are avoided.

Figure 2A:
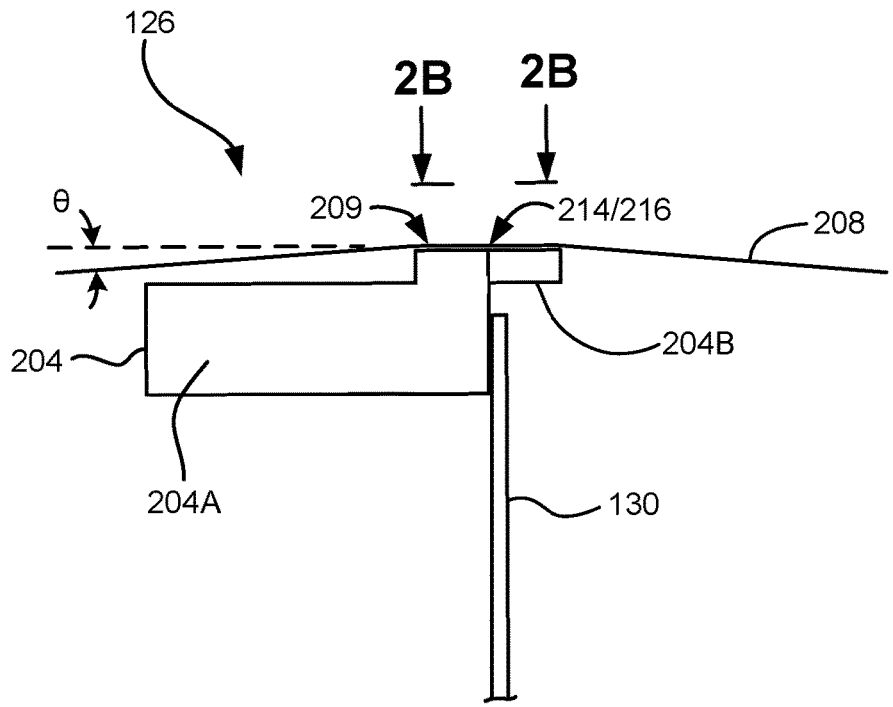
FIG. 2A illustrates a side view of a flat-lapped, bi-directional, two-module magnetic tape head according to one approach.

FIG. 2A illustrates a side view of a flat-lapped, bi-directional, single-module magnetic tape head 126 and cable 130 according to one approach. As shown, the head includes a module 204. Each module 204 includes a substrate 204A and a closure 204B with a thin film portion therebetween, commonly referred to as a "gap" in which the read and write data transducers 214, 216 are formed. In use, a tape 208 is moved over the module 204 along a media (tape) bearing surface 209 in the manner shown for reading and writing data on the tape 208 using the data transducers. The wrap angle θ of the tape 208 at edges going onto and exiting the flat media support surfaces 209 are usually between about 0.1 degree and about 3 degrees.

The substrate 204A is typically constructed of a wear resistant material, such as a ceramic. The closure 204B may be made of the same or similar ceramic as the substrate 204A.

Figure 2B:
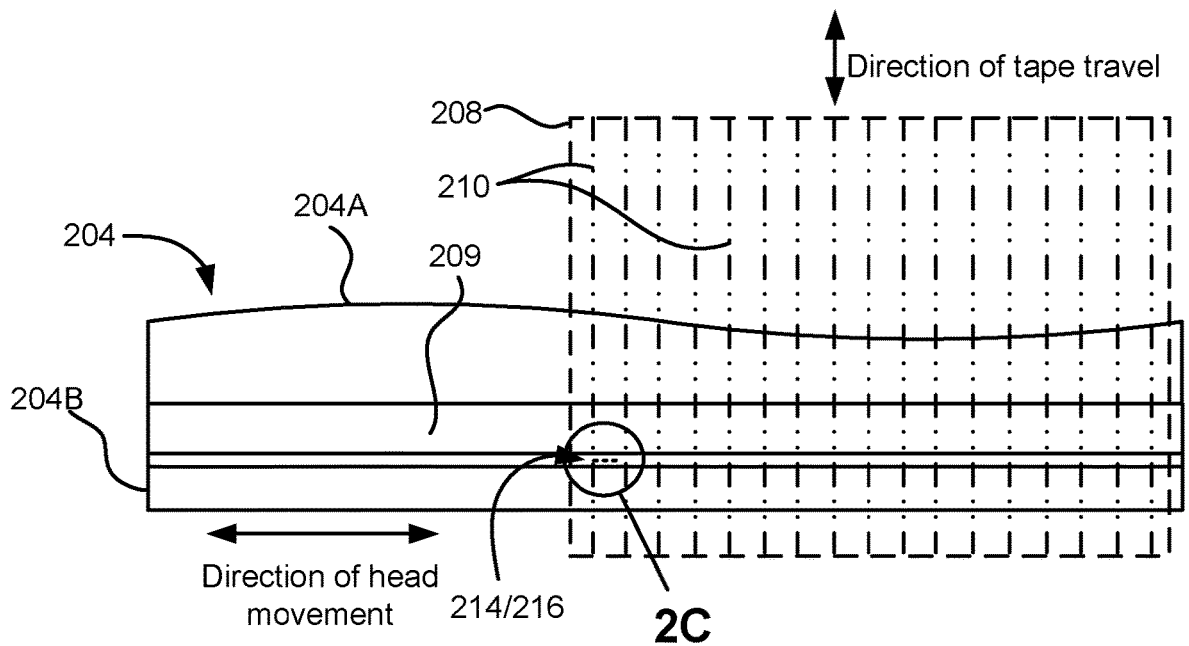
FIG. 2B is a tape bearing surface view taken from Line 2B of FIG. 2A.

FIG. 2B illustrates the tape bearing surface 209 of the module 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 214, 216 are positioned to specific track positions within one of the data bands. Outer read transducers, sometimes called servo read transducers or servo readers, read the servo tracks 210. The servo signals are in turn used in a conventional manner to keep the read transducers and/or write transducers 214, 216 aligned with a particular set of tracks during the read/write operations.

Figure 2C:
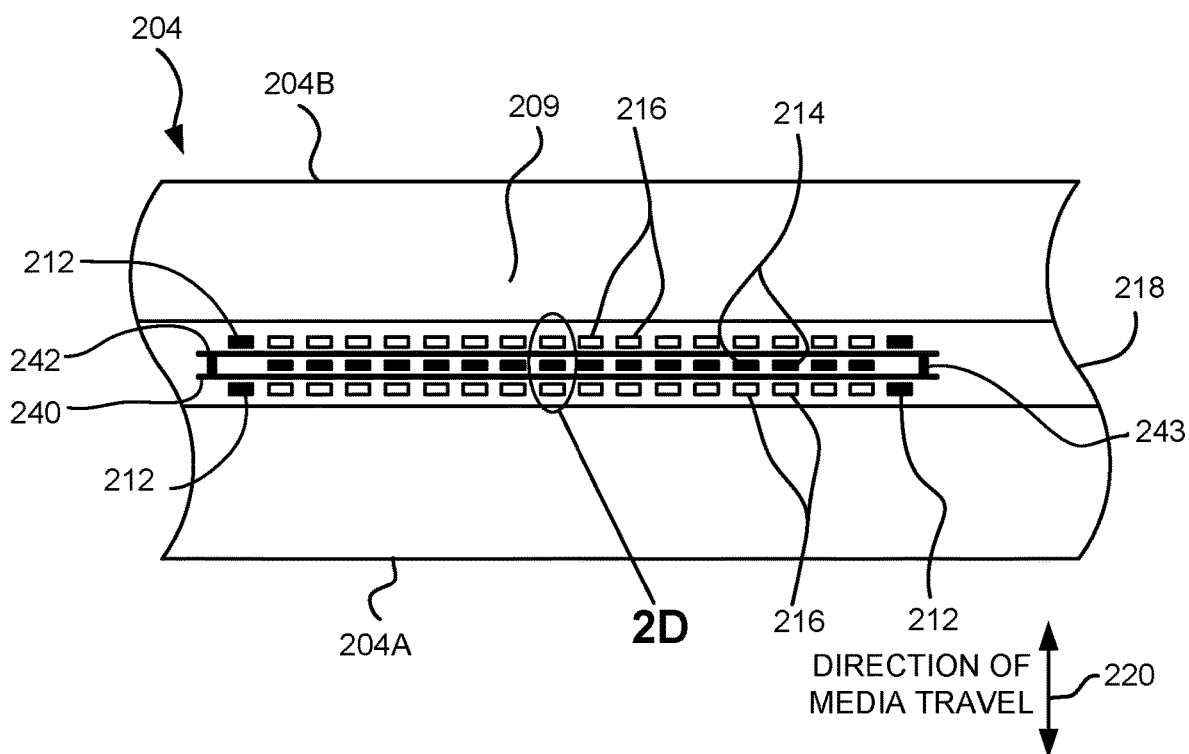
FIG. 2C is a detailed view taken from Circle 2C of FIG. 2B.

FIG. 2C depicts a plurality of arrays of data transducers 214, 216 formed in a gap 218 on the module 204 in Circle 2C of FIG. 2B. As shown in FIG. 2C, the arrays of data transducers 214, 216 includes, for example, an inner array of 16 first transducers 214, and two outer arrays of 16 second transducers 216 positioned on opposite sides of the inner array, though the number of elements in each array may vary. Illustrative approaches include 8, 16, 32, 40, and 64 active data transducers 214, 216 per array. An illustrative approach includes 32 read transducers per array of read transducers and 32 write transducers per array of write transducers, noting that the actual number of transducer elements in each array could be greater, e.g., 33, 34, etc. per array. Multiple simultaneously-operated transducers allow the tape to travel at a modest velocity while maintaining a high data transfer rate. Lower velocities are desired to reduce mechanical difficulties from speed-induced tracking.

One or more servo read transducers 212 may be positioned adjacent one or more of the arrays. Though shown along the outer arrays in FIG. 2C, servo read transducers 212 may also and/or alternatively be present along the inner array. Preferably, the servo read transducers 212 of one array are independently operated from servo read transducers 212 of another array. This independent operation enables such things as redundant servoing for higher track following accuracy, the ability to continue operation upon loss of one of the servo read transducers 212, etc.

The data transducers 214, 216 and servo read transducers 212 may be of conventional design, construction, and operation.

Generally, the magnetic tape medium moves in a forward direction and a reverse direction, as indicated by arrow 220, alternating direction as is conventionally done. The magnetic tape medium and transducers of the module 204 operate in a transducing relationship in manner known in the art.

In one approach, the transducers are arranged in a read-write-read (RWR) configuration, whereby the transducers 214 in the inner array are write transducers and the transducers 216 in the outer arrays are read transducers. As noted by considering FIGS. 2A and 2B-2C together, the positioning of the arrays of data transducers 214, 216 may enable bi-directional reading and writing, read-while-write capability, backward compatibility, etc.

In another approach, the transducers are arranged in a write-read-write (WRW) configuration, whereby the transducers 214 in the inner array are read transducers and the transducers 216 in the outer arrays are write transducers. Again, as noted by considering FIGS. 2A and 2B-2C together, the positioning of the arrays of data transducers 214, 216 may enable bi-directional reading and writing, read-while-write capability, backward compatibility, etc.

Accordingly, variations of a multi-array module include a RWR configuration (FIG. 2A), a WRW configuration, a RRW configuration, a WWR configuration, etc. In yet other variations, more than three arrays of transducers 214, 216 may be present on the single module, e.g., in a WRRW, a RWWR arrangement, etc. For simplicity, a RWR configuration is used primarily herein to exemplify but one of the many possible approaches of the present invention. One skilled in the art apprised with the teachings herein will appreciate how permutations of the present invention would apply to configurations other than a RWR configuration.

As shown in FIG. 2C, a first electrical shielding layer 240 is positioned above the lower array of read transducers, between said lower array and the array of write transducers thereabove. A second electrical shielding layer 242 is positioned above the array of write transducers, between the array of write transducers and the uppermost array of read transducers.

While various configurations, features and functions of the electrical shielding layers 240, 242 are provided in more detail below, in general, the electrical shielding layers 240, 242 help isolate the transducers and their lead structures in the middle array from the transducers and their lead structures in the outer arrays of transducers 216 in an analogous manner as a Faraday shield or Faraday cage. As described in more detail below, the lead structures of each array may be located in a dedicated lead layer. This configuration allows the lead layers of each array to be isolated by the electrical shielding layers 240, 242, as well as allows connecting the transducers to pads such that the read transducer pads are disentangled from the write transducer pads, thereby enabling cabling to each array in separate groups, which further reduces crosstalk. For example, the cable can be divided into three sets of traces that are separated by a low resistance to ground.

The electrical shielding layers 240, 242 may be constructed of any electrically conductive material that provides the desired functionality, mainly reducing crosstalk between adjacent transducers 214, 216, especially the lead structures thereof. In general, materials having higher electrical conductivity are preferred. Illustrative materials include copper, gold, etc. Alloys of metals, ceramics, etc. may also be employed in various approaches. Each electrical shielding layer 240, 242 should be thick enough to provide at least a 50% reduction in detectable crosstalk between adjacent transducers, and ideally at least an 80% reduction in detectable crosstalk, relative to an otherwise identical structure without the electrical shielding layer. For copper or gold, an illustrative thickness range is 1 to 10 micrometers thick. The electrical shielding layers 240, 242 may be formed by any conventional process, e.g., plating, sputtering, etc.

In some approaches, side shields 243 extending between the electrical shielding layers 240, 242 may be present. The side shields 243 may have a similar construction and common dimensions as the electrical shielding layers 240, 242, or may be different therefrom. Preferably, the side shields 243 electrically connect the electrical shielding layers 240, 242 together.

In another approach, the electrical shielding layers 240, 242 are electrically connected together by a smaller conductor, such as a via, wire bond, etc. However, in another approach, the electrical shielding layers 240, 242 are not electrically connected together in the module (but may be effectively electrically coupled via a common ground).

In preferred approaches, the electrical shielding layers 240, 242 are electrically coupled to circuit ground, e.g., the ground of the electronics that the reader and writer circuits are referenced to. In some approaches, the substrate and closure are intentionally connected to such a circuit ground. In that case, the electrical shielding layers 240, 242 may need only be connected to the substrate and/or closure or its pad. In other approaches, the electrical shielding layers 240, 242 may be coupled to a lead extending from at least one of the electrical shielding layers 240, 242 to a grounding pad on an exterior of the module. A separate pad/lead of the cable may be coupled to the grounding pad to provide the grounding.

In other approaches, the electrical shielding layers 240, 242 are floating, i.e., not electrically coupled to ground. In further approaches, the electrical shielding layers 240, 242 are coupled to a predefined potential other than circuit ground.

Figure 2D:
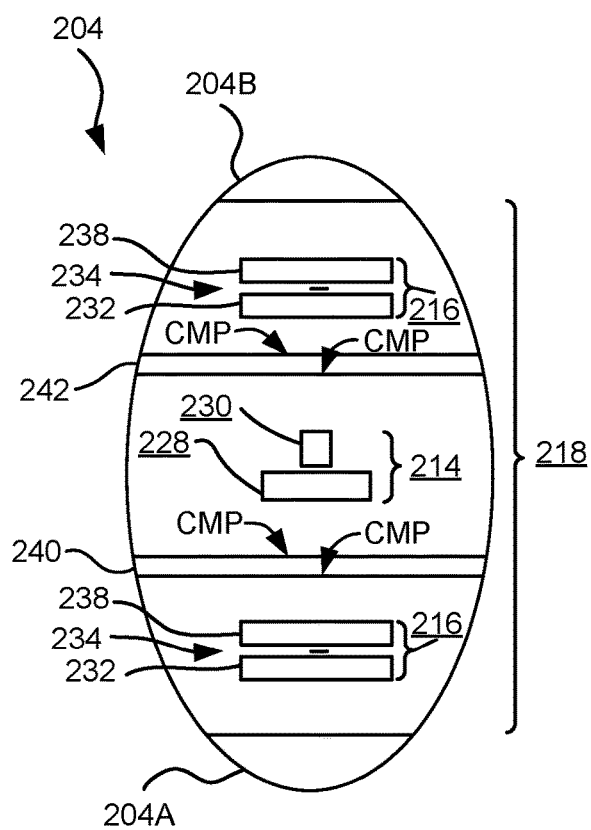
FIG. 2D is a detailed view taken from Circle 2D of FIG. 2C.

FIG. 2D shows a partial tape bearing surface view taken from Circle 2D of FIG. 2C. In the example shown, the transducers 214, 216 are arranged in a RWR configuration. Those skilled in the art will appreciate that WRW and other configurations would have similar features, with the respective transducers arranged to provide the desired configuration and functionality.

When a module 204 having a RWR configuration is constructed, layers are formed in the gap 218 created above an electrically conductive substrate 204A (partially shown), e.g., of AlTiC, in generally the following order: a lower array of read transducers 216, a first electrical shielding layer 240, an array of write transducers 214, a second electrical shielding layer 242, and an upper array of read transducer 216.

Preferably, at least some of the surfaces marked with CMP in FIG. 2D are planarized, e.g., via conventional chemical mechanical polishing (CMP) or other known planarization process to assist in formation of the arrays of transducers one atop another.

The transducers 214, 216 may have any known construction. In one illustrative approach, presented by way of example only, each read transducer 216 has a first shield 232 typically of an iron alloy such as NiFe (e.g., ~80/20 at % NiFe, also known as permalloy, cobalt zirconium tantalum (CZT) or Al—Fe—Si (Sendust), a sensor 234 for sensing a data track on a magnetic medium, and a second shield 238 typically of a nickel-iron alloy (e.g., permalloy). The write transducer 214 has first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Referring again to FIGS. 2C and 2D, the transducers 214, 216 are constructed to form a single physical module to provide read-while-write capability in the single module, which does not significantly suffer from crosstalk.

Read-while-write operation is performed by activating the write transducers of the inner array and the read transducers in the trailing array. Because the read transducers are aligned with the write transducer in a direction parallel to the direction of media travel relative thereacross, the read transducers in the trailing array are able to read the data just written.

More details about the various layers and structures shown in FIGS. 2A-2D are presented below, by way of example only, with reference to an illustrative fabrication process. Those skilled in the art, once apprised of the teachings herein, will understand how the illustrative fabrication process can be modified to create various other module configurations described herein as additional aspects of the present invention.

Figure 3A:
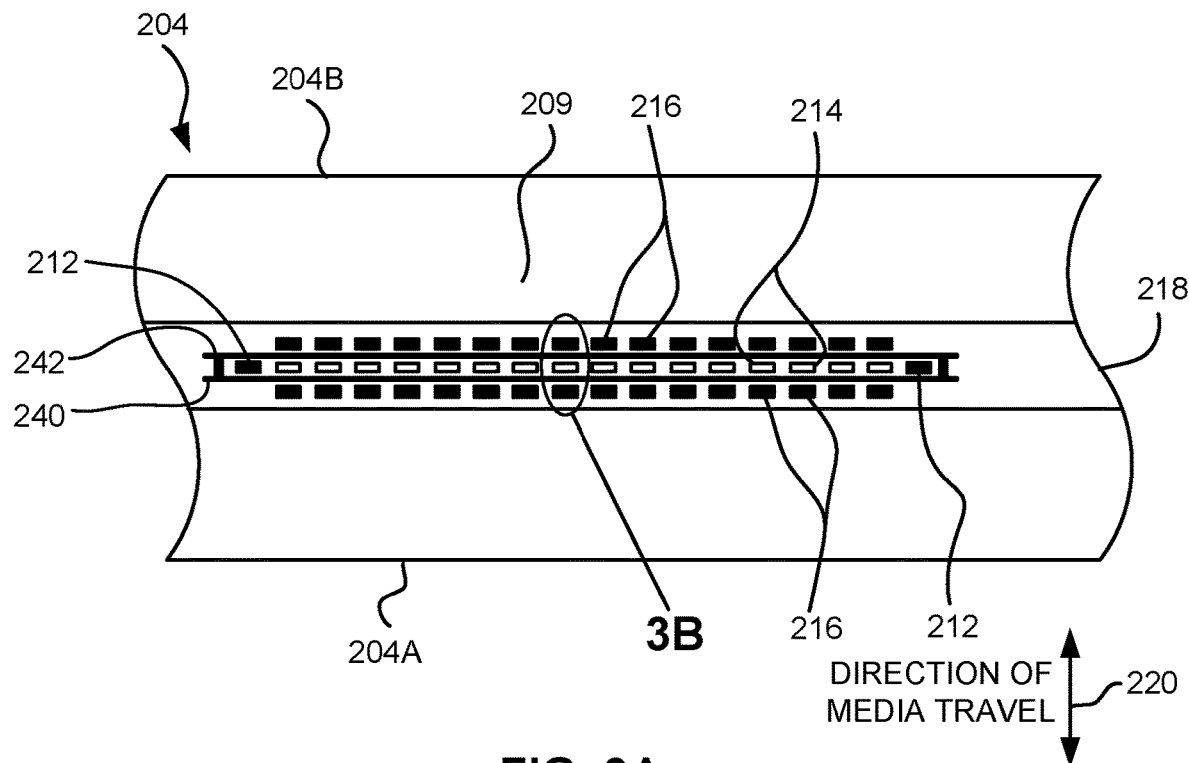
FIG. 3A is a partial tape bearing surface view of a module having a write-read-write configuration according to one approach.
Figure 3B:
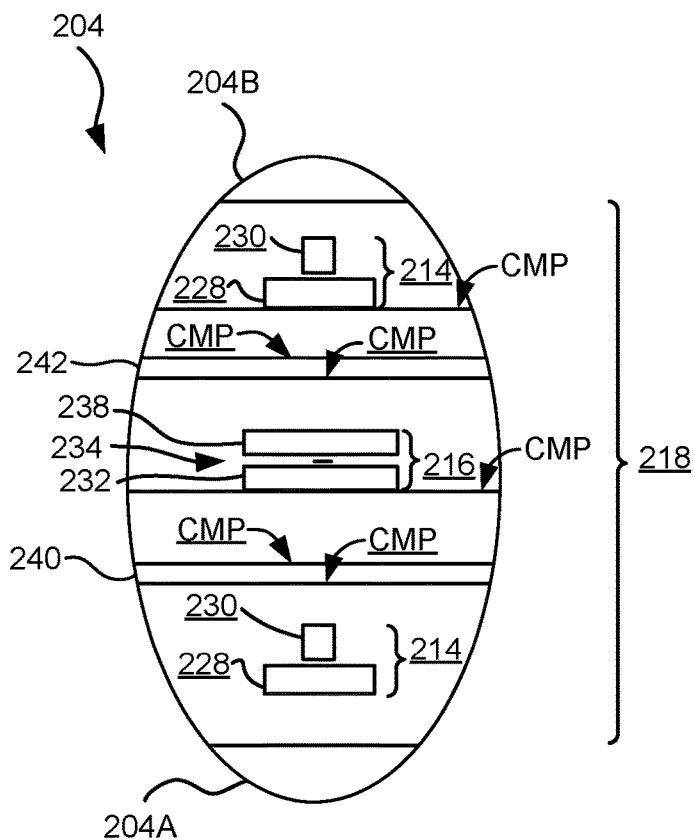
FIG. 3B is a detailed view taken from Circle 3B of FIG. 3A.

FIGS. 3A-3B depict a module 204 having a WRW configuration, in accordance with one approach. As an option, the present module 204 may be implemented in conjunction with features from any other aspects listed herein, such as those described with reference to the other FIGS. Of course, however, such module 204 and others presented herein may be used in various applications and/or in permutations which may or may not be specifically described in the illustrative approaches listed herein. Further, the module 204 presented herein may be used in any desired environment, such as a drive used to read or write multiple cartridges, a drive with a dedicated tape such as an embedded system, etc.

As shown, the module 204 of FIGS. 3A-3B has similar features as the module of FIG. 2C-2D, and common elements retain the same numbering. However, the data transducers 216 in the outer arrays are write transducers and the data transducers 214 in the inner array are read transducers.

Note that the servo read transducers 212 are shown adjacent the inner array of read transducers. In other approaches, servo read transducers 212 may also and/or alternatively be positioned along the outer arrays, though this is less preferred when the outer arrays include write transducers due to the aforementioned crosstalk issues.

Figure 4:
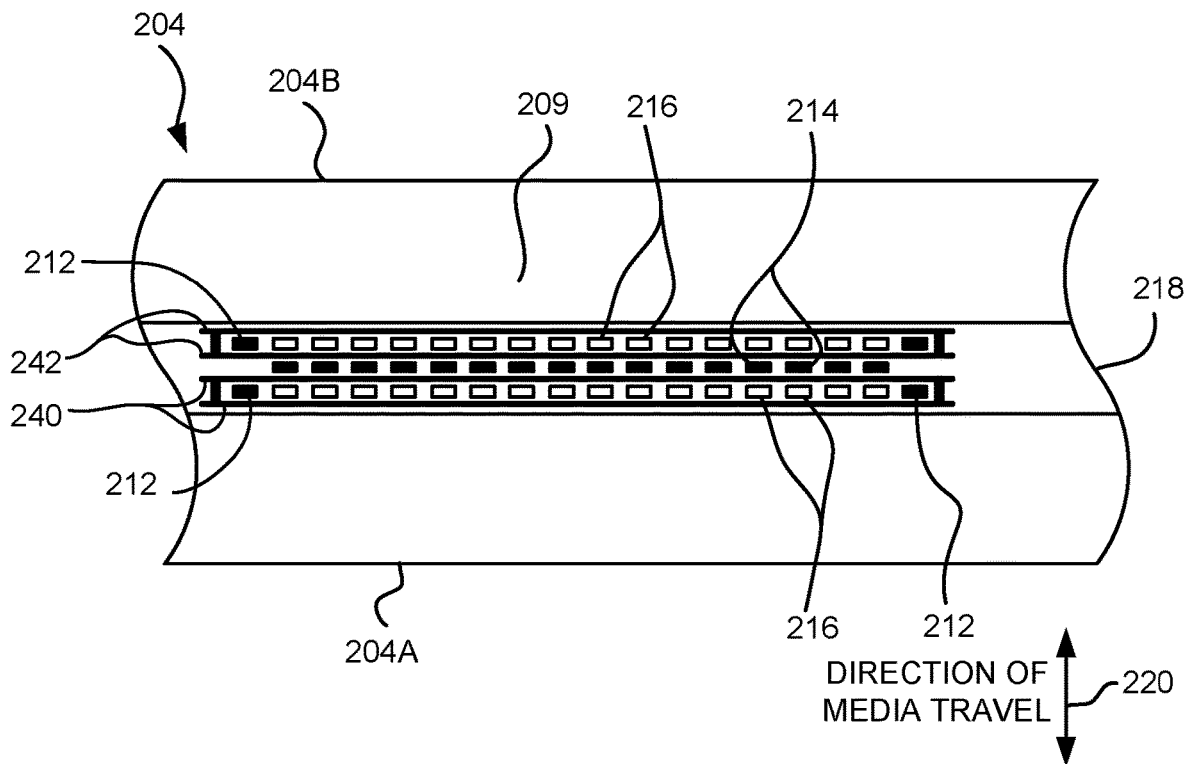
FIG. 4 is a partial tape bearing surface view of a module according to one approach.

FIG. 4 depicts a module 204 having an alternate electrical shielding layer configuration, in accordance with one approach. As an option, the present module 204 may be implemented in conjunction with features from any other approach listed herein, such as those described with reference to the other FIGS. Of course, however, such module 204 and others presented herein may be used in various applications and/or in permutations which may or may not be specifically described in the illustrative approaches listed herein. Further, the module 204 presented herein may be used in any desired environment.

As shown, the module 204 of FIG. 4 has similar features as the module of FIG. 2C-2D, and common elements retain the same numbering. However, additional electrical shielding layers 240, 242 are present. In the approach shown, the two sets of electrical shielding layers 240, 242 sandwich a respective outer array. As noted elsewhere herein, the electrical shielding layers 240, 242 may be: all electrically coupled together, coupled in pairs as shown, grounded, floating, etc.

FIGS. 5A-5J depict a graphical representation of a process for forming a RWR module 204 as shown in FIG. 2C, in accordance with one approach. As an option, the present process, with appropriate modification as would be appreciated by one skilled in the art upon reading the present description, may be implemented in conjunction with features from any other approach listed herein, such as those described with reference to the other FIGS. Of course, however, such process and others presented herein may be used in various applications and/or in permutations which may or may not be specifically described in the illustrative approaches listed herein. Further, the process presented herein may be used in any desired environment. Moreover, conventional fabrication techniques may be adapted based on the teachings herein to construct the various structures. Finally, those skilled in the art will appreciate that though layers/structures created in previous steps are shown in some drawings, this is done to assist in understanding the relative locations of the various components. It is likely that such previously-formed layers would be covered by overlying layers if viewed from above at the various processing stages.

Figure 5A:
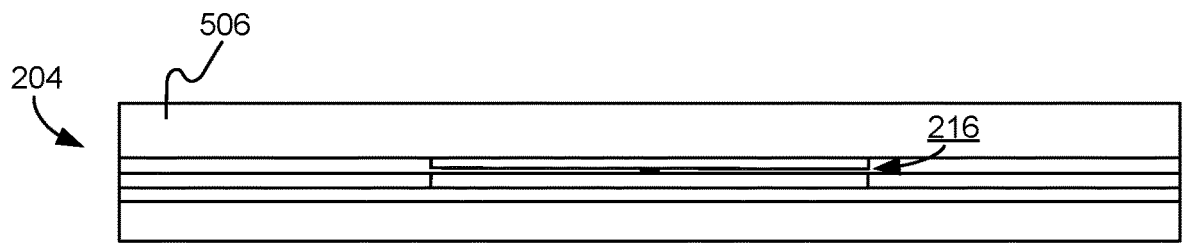

An array of read transducers 216 is formed above a substrate 204A via conventional techniques. FIG. 5A is a partial media facing surface cross-sectional view depicting one of the resulting read transducers 216.

Figure 5B:
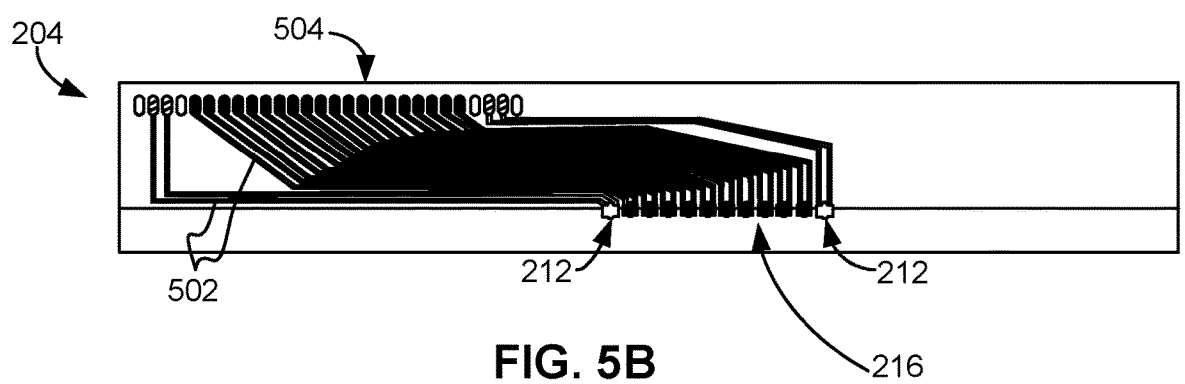

As shown in FIG. 5B, which is a partial top-down view of the wafer, leads 502 extending from the read transducers 216 in the array to a first pad area 504 of the module 204 are formed via conventional techniques. Leads 502 extending from the servo read transducers 212 to the first pad area 504 are also formed. Preferably, major portions of the leads 502 are coplanar, lying along a common plane, e.g., by formation on a common surface.

Referring again to FIG. 5A, an overcoat layer 506 is formed and planarized, e.g., via CMP. The overcoat layer 506 may be of conventional construction, e.g., including alumina and/or other dielectric material.

Referring to FIGS. 5C-5D, an electrical shielding layer 240 is formed above the planarized surface of the overcoat layer 506, and thus resides in a plane above the leads 502 extending from the lower array.

The electrical shielding layer 240 is preferably at least as wide as the underlying array of transducers 216 in a direction parallel to (the longitudinal axis of) the array of transducers 216, thereby providing the desired shielding between the leads 502 and the leads to be formed thereabove. The electrical shielding layer 240 is preferably wider than the distance between the servo read transducers 212. Thus, the electrical shielding layer 240 may have a width up to the width of the module 204.

The electrical shielding layer 240 may be recessed slightly from the expected location of the media facing surface of the module to avoid corrosion and/or wear thereof. Recession is preferably less than 3 micrometers from the expected location of the media facing surface. The region between the media facing side of the electrical shielding layer and the expected location of the media facing surface of the module may be coated; backfilled e.g., with alumina; etc.

An undercoat layer 510 is formed above the electrical shielding layer 240. The undercoat layer 510 may be of conventional construction, e.g., including alumina and/or other dielectric material. The undercoat layer 510 is planarized in preparation for construction and electrical isolation of the overlying array of transducers.

Referring to FIGS. 5E-5F, an array of write transducers 214 is constructed above the undercoat layer 510 via conventional techniques.

Leads 512 extending from the write transducers 214 in the array to a second pad area 514 of the module 204 are formed via conventional techniques. Preferably, major portions of the leads 512 are coplanar, lying along a common plane, e.g., by formation on a common surface. The second pad area 514 is spaced from the first pad area 504 to assist in isolating the leads, thereby reducing crosstalk. Segregation of the read and write pads into distant groups allows introduction of the electrical connection to the cable such that a cable can be designed to maintain the segregation and thus avoid crosstalk in the cable.

Referring to FIG. 5E, an overcoat layer 516 is formed and planarized, e.g., via CMP. The overcoat layer 516 may be of conventional construction, e.g., including alumina and/or other dielectric material. The overcoat layer 516 may be similar to, or have different composition and/or construction than, overcoat layer 506.

Referring to FIGS. 5G-5H, an electrical shielding layer 242 is formed above the planarized surface of the overcoat layer 516, and thus resides in a plane above the leads 512 extending from the middle array.

The electrical shielding layer 242 may have any shape, width and/or construction as the electrical shielding layers 240, 242 discussed elsewhere herein. Moreover, the electrical shielding layers 240, 242 may be similar to, or have different composition and/or construction than, one another.

An undercoat layer 520 is formed above the electrical shielding layer 242. The undercoat layer 520 may be of conventional construction, e.g., including alumina and/or other dielectric material. The undercoat layer 520 is planarized in preparation for construction of the overlying array of transducers. The undercoat layer 520 provides electrical isolation of the array to be formed thereabove from the electrical shielding layer 242.

Figure 5I:
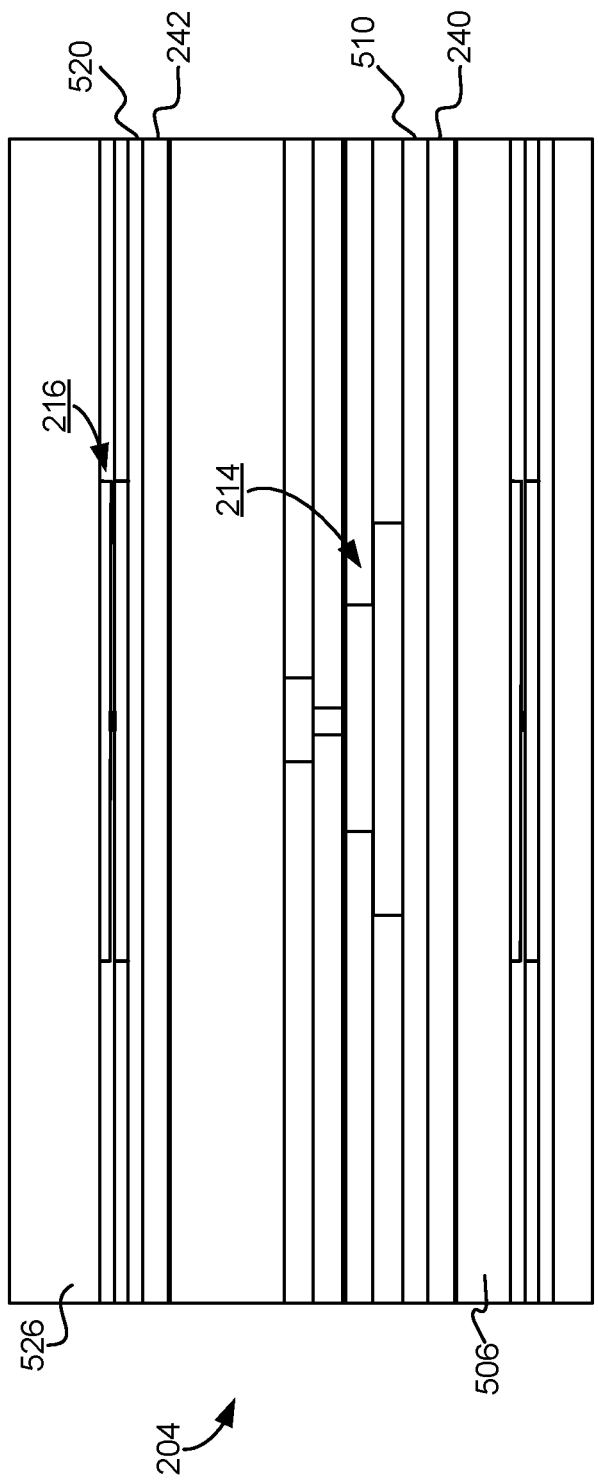
Figure 5J:
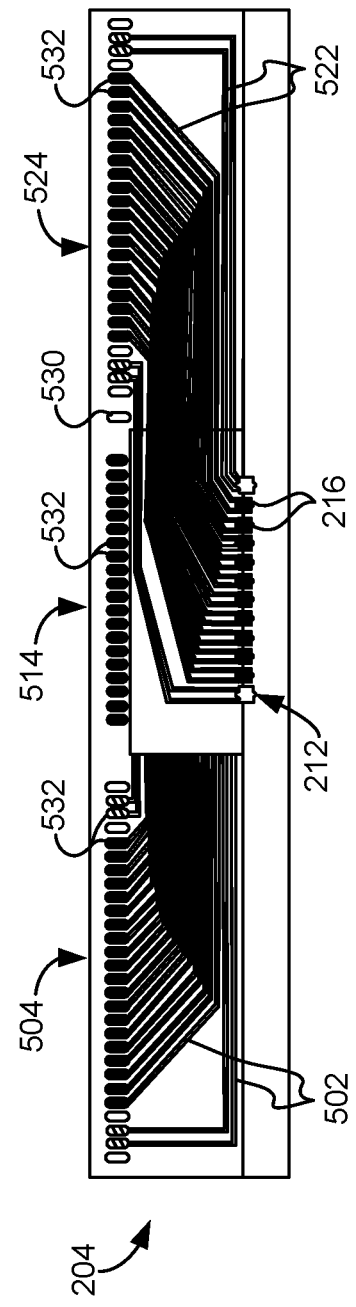

Referring to FIGS. 5I-5J, an array of read transducers 216 is constructed above the undercoat layer 520 via conventional techniques. The array of read transducers 216 may be constructed as noted above with reference to FIGS. 5A-5B, but other constructions are also contemplated. As in the lower portion of the module, servo read transducers 212 may be constructed as well. Leads 522 extending from the read transducers 216 in the array to a third pad area 524 of the module 204 are formed via conventional techniques. The third pad area 524 is spaced from the first and second pad areas 504, 514. An overcoat layer 526 may be formed thereabove and planarized. Conductive vias to connect the leads 502, 512, 522 to bonding pads on an outer surface of the module may be formed during various stages of the process, using conventional techniques. Bonding pads 532 for bonding to the cable may be formed in the pad area 504, 514, 524 using conventional techniques. A closure may be coupled to the structure.

The media facing surface of the module may be defined during post-wafer processing using conventional techniques.

The final module 204 includes the three layers of lead structures, each lying along a respective plane that is spaced from the other planes.

The electrical shielding layers 240, 242 provide shielding between the leads, thereby reducing crosstalk between the layers of leads. Preferably, one or both electrical shielding layers 240, 242 has a width that is greater than a distance between outermost ones of the leads 512 extending from the second array. This width minimizes crosstalk between the leads 502, 512, 522. For example, a width of at least one of the electrical shielding layers 240, 242 may be less than a distance between a pad in the first pad area and a pad in the third pad area that are positioned closest together, e.g., the pads that flank the second pad area.

One of the electrical shielding layers 240, 242, and preferably both electrical shielding layers 240, 242, are coupled to ground, preferably circuit ground. A separate lead may be formed to couple one or both electrical shielding layers 240, 242 to a grounding pad 530, for coupling to a grounding lead of the cable. In another approach, one or both electrical shielding layers 240, 242 are coupled to circuit ground of the storage system and/or module substrate, e.g., the ground that the storage system or electronics in the module operate with. Connections may be made using known techniques, e.g., by formation of a conductive via or vias, wire bonding, cabling, etc.

The pad areas 504, 514, 524 preferably include conventional pads arranged for coupling to a single cable, but said pads could be arranged for coupling to more than one cable, e.g., a unique cable for each array.

Note also that the pad area 504, 514, 524 to which each set of leads 502, 512, 522 is directed is generally unimportant. Accordingly, for example in FIG. 5J, though the lower leads 502 extend to the first pad area 504, the leads 502 could instead extend one of the other pad areas 514, 524. The leads shown in that pad area in FIG. 5J would likewise instead extend to a different pad area 504, 514, and so on.

Figure 6A:
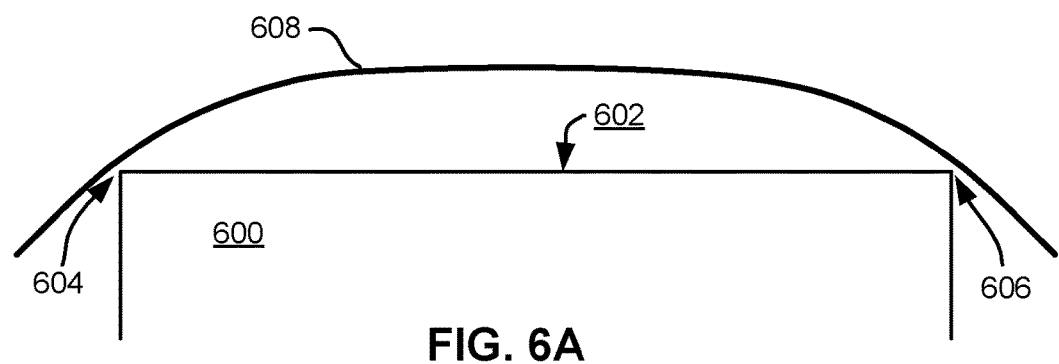
FIGS. 6A-6C are schematics depicting the principles of tape tenting.
Figure 6B:
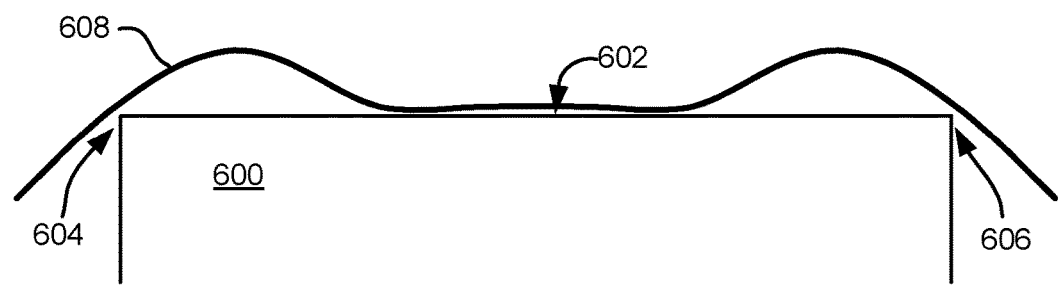
Figure 6C:
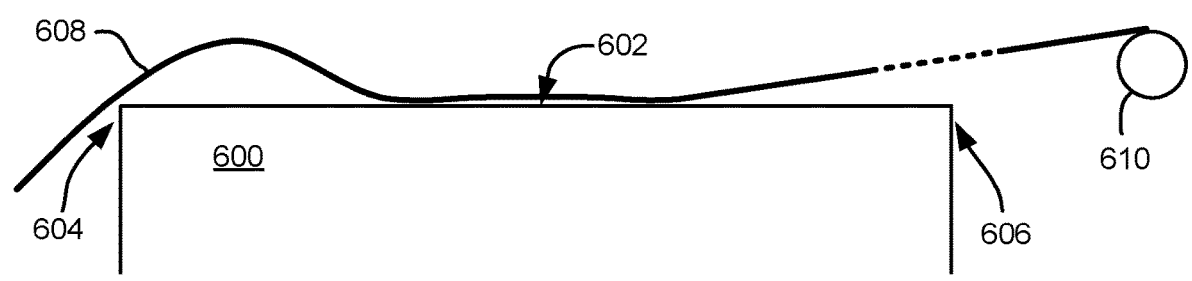

In use, as a tape is run over a module, it is preferred that the tape passes sufficiently close to the magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 6A-6C illustrate the principles of tape tenting. FIG. 6A shows a module 600 having an upper tape bearing surface 602 extending between opposite edges 604, 606. A stationary tape 608 is shown wrapping around the edges 604, 606. As shown, the bending stiffness of the tape 608 lifts the tape off of the tape bearing surface 602. Tape tension tends to flatten the tape profile, as shown in FIG. 6A. Where tape tension is minimal, the curvature of the tape is more parabolic than shown.

FIG. 6B depicts the tape 608 in motion. The leading edge, i.e., the first edge the tape encounters when moving, may serve to skive air from the tape, thereby creating a subambient air pressure between the tape 608 and the tape bearing surface 602. In FIG. 6B, the leading edge is the left edge and the right edge is the trailing edge when the tape is moving left to right. As a result, atmospheric pressure above the tape urges the tape toward the tape bearing surface 602, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 6C depicts how the subambient pressure urges the tape 608 toward the tape bearing surface 602 even when a trailing guide 610 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various aspects herein can be implemented with a wide range of file system formats, including for example IBM Spectrum Archive Library Edition (LTFS LE). However, LTFS is listed by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 7:
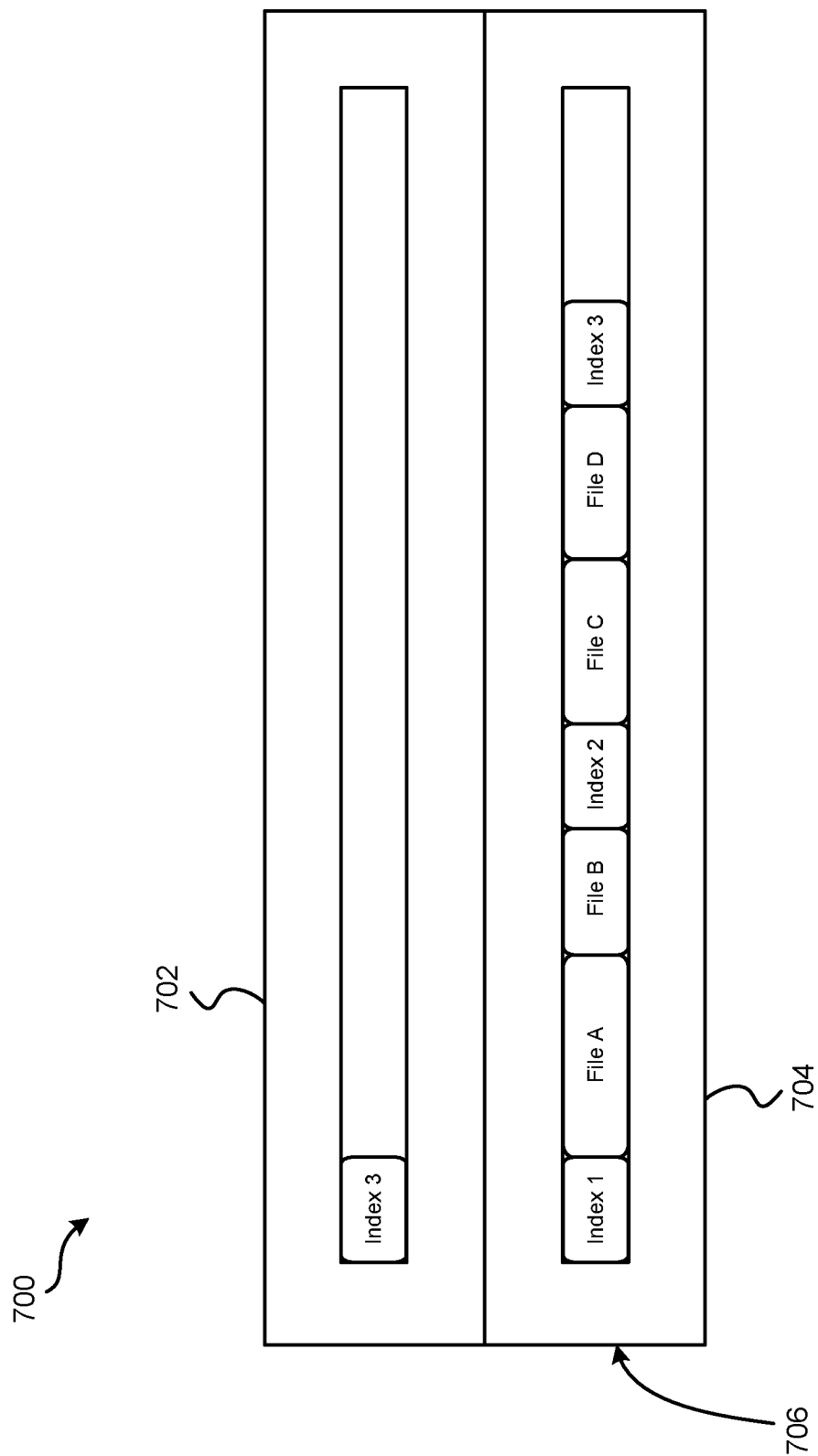
FIG. 7 is a representational diagram of files and indexes stored on a magnetic tape according to one approach.

Looking to FIG. 7, a magnetic tape 700 having an index partition 702 and a data partition 704 is illustrated according to one approach. As shown, data files and indexes are stored on the tape. The LTFS format allows for index information to be recorded in the index partition 702 at the beginning of tape 706, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 7, a most recent version of metadata Index 3 is recorded in the index partition 702 at the beginning of the tape 706. Conversely, all three version of metadata Index 1, Index 2, Index 3 as well as data File A, File B, File C, File D are recorded in the data partition 704 of the tape. Although Index 1 and Index 2 are old (e.g., outdated) indexes, because information is written to tape by appending it to the end of the previously written data as described above, these old indexes Index 1, Index 2 remain stored on the tape 700 in the data partition 704 without being overwritten.

The metadata may be updated in the index partition 702 and/or the data partition 704 the same or differently depending on the desired approach. According to some aspects, the metadata of the index and/or data partitions 702, 704 may be updated in response to the tape being unmounted, e.g., such that the index may be read quickly from the index partition when that tape is mounted again. The metadata is preferably also written in the data partition 704 so the tape may be mounted using the metadata recorded in the data partition 704, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

The various aspects of the present invention described herein provide a plethora of advantages. Each approach described herein provides at least one of the following advantages, and in most cases, several of the following advantages.

The single module design with electrical shielding layers isolating the transducers in the distinct arrays allows read while write verification to occur.

In approaches that have two arrays of read transducers, two readers per track may be used to recover data from aged tracks in one pass using a conventional readback channel.

In approaches having servo read transducers in multiple arrays, the redundant servo redback capability enables continued use of the storage system in the event of a loss of one of the servo read transducers.

In approaches having servo read transducers in multiple arrays, redundant servo processing may be performed for better track following.

Relative to current multi-module heads, the single module design presented herein allows one post-wafer processing, such as media bearing surface definition, to replace individual post-wafer processing operations for each module, e.g., three for a three-module head. Similarly, fabrication only incurs one post-wafer single material cost.

Relative to current multi-module heads, the single module design may use a single cable for reduced cost.

Relative to current multi-module heads, the single module design enables alignment of the various arrays at wafer processing to lithography tolerances, e.g., through 10 nm wafer level alignment, as opposed to gluing modules together with a typical 100× misalignment, resulting in a built-in skew between arrays of the modules.

Relative to current multi-module heads, the single module design presented herein has a lower mass and volume, thereby enabling relatively higher speed track following and skew adjustment.

The relatively closer proximity of the arrays to one another reduces the buffer and timing variation for read verification.

The conventional shingle guard band size on magnetic recording tape may be reduced when using a RWR configuration, as the same writer writes in both directions.

It will be clear that the various features of the foregoing systems and/or methodologies may be combined in any way, creating a plurality of combinations from the descriptions presented above.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the approaches, the practical application or technical improvement over technologies found in the marketplace, or to enable others of ordinary skill in the art to understand the aspects disclosed herein.

What is claimed is:

1. An apparatus, comprising:
    a module having:
        a first array of read transducers;
        a first electrical shielding layer above the first array of read transducers;
        an array of write transducers above the first electrical shielding layer;
        a second electrical shielding layer above the array of write transducers;
        a second array of read transducers above the second electrical shielding layer;
        first leads extending from the read transducers in the first array to a first pad area of the module;
        second leads extending from the write transducers to a second pad area of the module that is spaced from the first pad area; and
        third leads extending from the read transducers in the second array to a third pad area of the module that is spaced from the first and second pad areas,
        wherein a width of at least one of the electrical shielding layers in a direction parallel to the array of write transducers is greater than a distance between outermost ones of the second leads.

2. An apparatus as recited in claim 1, wherein the first electrical shielding layer is positioned between the first and second leads, wherein the second electrical shielding layer is positioned between the second and third leads.

3. An apparatus as recited in claim 1, wherein the first leads lie along a first plane, wherein the second leads lie along a second plane spaced from and above the first plane, wherein the third leads lie along a third plane spaced from and above the second plane.

4. An apparatus as recited in claim 1, wherein the electrical shielding layers are electrically connected together.

5. An apparatus as recited in claim 1, wherein the electrical shielding layers are electrically coupled to circuit ground.

6. An apparatus as recited in claim 5, comprising a lead extending from at least one of the electrical shielding layers to a pad on an exterior of the module.

7. An apparatus as recited in claim 1, comprising a third electrical shielding layer below the first array of read transducers and a fourth electrical shielding layer above the second array of read transducers.

8. An apparatus as recited in claim 1, comprising servo read transducers flanking the first array of read transducers and servo read transducers flanking the second array of read transducers.

9. An apparatus as recited in claim 1, further comprising:
    a drive mechanism for passing a magnetic medium over the module; and
    a controller electrically coupled to the arrays of transducers.

10. An apparatus as recited in claim 1, comprising at least one side shield extending between the first and second shielding layers.

11. An apparatus, comprising:
    a module having:
        a first array of read transducers;
        a first electrical shielding layer above the first array of read transducers;
        an array of write transducers above the first electrical shielding layer;
        a second electrical shielding layer above the array of write transducers;
        a second array of read transducers above the second electrical shielding layer;
        first leads extending from the read transducers in the first array to a first pad area of the module;
        second leads extending from the write transducers to a second pad area of the module that is spaced from the first pad area; and
        third leads extending from the read transducers in the second array to a third pad area of the module that is spaced from the first and second pad areas,
        wherein a width of at least one of the electrical shielding layers in a direction parallel to the array of write transducers is less than a distance between a pad in the first pad area and a pad in the third pad area positioned closest together.

12. An apparatus as recited in claim 11, comprising at least one side shield extending between the first and second shielding layers.

13. An apparatus as recited in claim 11, wherein the first electrical shielding layer is positioned between the first and second leads, wherein the second electrical shielding layer is positioned between the second and third leads.

14. An apparatus as recited in claim 11, wherein the first leads lie along a first plane, wherein the second leads lie along a second plane spaced from and above the first plane, wherein the third leads lie along a third plane spaced from and above the second plane.

15. An apparatus as recited in claim 11, wherein a width of at least one of the electrical shielding layers in a direction parallel to the array of write transducers is greater than a distance between outermost ones of the second leads.

16. An apparatus as recited in claim 11, wherein the electrical shielding layers are electrically connected together.

17. An apparatus as recited in claim 11, wherein the electrical shielding layers are electrically coupled to circuit ground.

18. An apparatus as recited in claim 17, comprising a lead extending from at least one of the electrical shielding layers to a pad on an exterior of the module.

19. An apparatus as recited in claim 11, comprising a third electrical shielding layer below the first array of read transducers and a fourth electrical shielding layer above the second array of read transducers.

20. An apparatus as recited in claim 11, comprising servo read transducers flanking the first array of read transducers and servo read transducers flanking the second array of read transducers.

21. An apparatus as recited in claim 11, further comprising:
  a drive mechanism for passing a magnetic medium over the module; and
  a controller electrically coupled to the arrays of transducers.

22. A method for fabricating a module, the method comprising:
  forming a first array of data transducers of a first type;
  forming a first electrical shielding layer above the first array of data transducers;
  forming an array of data transducers of a second type above the first electrical shielding layer;
  forming a second electrical shielding layer above the array of data transducers of the second type;
  forming a second array of data transducers above the second electrical shielding layer;
  forming first leads extending from the data transducers in the first array to a first pad area; and
  forming second leads extending from the data transducers of the second type to a second pad area that is spaced from the first pad area;
  forming third leads extending from the data transducers in the second array to a third pad area that is spaced from the first and second pad areas,
  wherein a width of at least one of the electrical shielding layers in a direction parallel to the array of data transducers of the second type is greater than a distance between outermost ones of the second leads.

* * * * *